United States Patent
Redmond

[19]

[11] Patent Number: 5,969,618
[45] Date of Patent: Oct. 19, 1999

[54] FAILURE SENSOR HOSE

[76] Inventor: Thomas Redmond, P.O. Box 3447, Brentwood, Tenn. 37024

[21] Appl. No.: 08/774,869

[22] Filed: Dec. 19, 1996

[51] Int. Cl.$^6$ ................................................. G08B 21/00
[52] U.S. Cl. ...................... 340/604; 340/605; 340/618; 340/620; 340/438; 285/8; 285/10; 73/40.5 R; 174/11 R
[58] Field of Search ................................... 340/604, 605, 340/618, 620, 438; 285/8, 10, 149.1, 256, 259; 73/40.5 R; 174/11 R

[56] References Cited

U.S. PATENT DOCUMENTS

| | | | |
|---|---|---|---|
| 3,564,526 | 2/1971 | Butts | 200/61.04 |
| 3,907,336 | 9/1975 | Siegmund | 285/149 |
| 4,142,554 | 3/1979 | Washkewicz et al. | 138/109 |
| 4,212,487 | 7/1980 | Jones et al. | 285/259 |
| 4,673,926 | 6/1987 | Gorman | 340/605 |
| 5,084,679 | 1/1992 | Lofgren | 340/605 |
| 5,279,148 | 1/1994 | Brandes | 73/40.5 R |
| 5,343,738 | 9/1994 | Skaggs | 73/40.5 R |

*Primary Examiner*—Daniel J. Wu
*Assistant Examiner*—Julie B. Lieu

[57] ABSTRACT

A hose capable of carrying current to an indicator which provides external warning of imminent failure, or leak, due to wear occurring within the hose. The hose consists of an internal (primary) hose which is surrounded by an external (secondary) hose. Positioned in the annulus between the two hoses are two non-contacting electrical wires. At a point, the two electrical wires extend beyond and outside of the hoses. The protruding wires attach to a low voltage power source and to a hose failure indicator, or alarm, in series. When the internal (primary) hose fails, the fluid inside the hose escapes into the annulus between the primary and secondary hoses, making contact with the two electrical leads. This closes the circuit, thereby activating the external indicator, which may be a light or an audible signal or some other type of alarm. The external (secondary) hose is designed to withstand normal operating stress for a reasonable amount of operating hours until the hose can be replaced.

6 Claims, 2 Drawing Sheets

FAILURE SENSOR HOSE

Technical Field

This invention relates to the field of hoses; more specifically it pertains to the field of hoses containing within them an electrical warning system for hose failure.

BACKGROUND ART

The use of pliable conduit or "hose" is common in a variety of mechanical devices. Hoses are used to supply hot and cold water to washing machines; they circulate engine coolant and "anti-freeze" to automobile radiators; they provide conduit for drilling fluids during oil well drilling operations; and so on.

As with any other feature within a mechanical device, hoses are subject to wear and deterioration. Degenerative forces exist both inside and outside of a hose which can cause internal failure. Fluid carried within a hose may be corrosive, either because of the chemical composition of the fluid, because of abrasive particulants invading the fluid, or because of high fluid temperature. Likewise, outside forces such as temperature fluctuations, ozone, and weathering, not to mention compression and extension from use (and abuse) will produce deterioration of the hose. These forces create an environment in which, given enough time, a hose will experience failure.

The consequences of failure in a hose can be dramatic. The clothes washing machine hose which splits can cause extensive water damage to carpet and woodwork. The radiator hose which loses containment can produce a cracked block when the engine overheats, ultimately rendering the vehicle immobile. The mud hose on a drilling rig which leaks causes a loss of hydrostatic pressure in the well, creating the potential for a "kick" in the formation and a subsequent "blowout", costing investors a great deal of money.

An incident of hose failure can also create a risk of personal injury. The motorist stranded on the road because of a leak in water or radiator fluid is in self-evident danger.

The first thought towards prevention of hose failure would be to create a stronger hose. This could be done by either manufacturing a more durable or wear-resistant material, or by increasing the wall thickness of the hose. Purely from the standpoint of loss prevention, these remedies are perfectly adequate. However, from a functional standpoint the alteration of material or the increase in wall thickness renders the hose less pliable. This, in turn, renders the conduit less of a pliable hose which can be bent or twisted for use and transportation, and more of a rigid pipe. The end result is a conduit which is difficult to manipulate and more expensive to produce.

A more attractive remedy would be to create a hose containing within it an early warning system for failure. In this way, the imminent failure of a hose from within could be detected. It is an object of the present invention to provide such an early warning system through the use of a fluid detector within the hose wall.

It is an additional object of this invention to provide an electrical warning system which can be installed into hoses made of material common in the current technology, and which could be installed during the manufacturing process.

It is another object of the present invention to have an electrical system for the detection of internal hose failure, where warning is provided in an easily observable external manner.

It is also an object of the present invention to have an electrical system of detecting hose failure which can be utilized in a variety of hoses, and for a variety of mechanical applications, such system having utility for any pliable hose carrying conductive fluid under pressure.

Further, it is an object of this invention to have an electrical system of detecting hose failure created by placing two electrical leads between a primary (internal) hose, and a secondary (external) hose, with the ends of the electrical leads being connected to a circuit including a low voltage power source and an alarm such as a light, the alarm being activated when the primary hose is penetrated and the fluid escapes into the annular space between the hoses, contacting the lead wires and thereby closing the circuit.

It is also an object of the current invention to have a coaxially aligned reinforcement hose capable of carrying electrical current which can be attached to an ordinary faucet fastener by a short hose stem, by placing a two-hose clamp over the stem and the hose.

DISCLOSURE OF THE INVENTION

Other objects and advantages will be accomplished by the present invention which provides an electrical warning system for imminent hose failure. The preferred embodiment of this warning system is comprised of a primary hose received within a secondary hose, an annular space being defined between the primary and secondary hoses. Resting in the annular space between the two hoses are two wires, or electrical leads, which are situated co-axially. At a point, the leads extend beyond one end of the primary and secondary hoses, and are connected in circuit to a low voltage source and an alarm. When the primary hose fails, the fluid in the system invades the annular space and contacts the two electrical leads. When both leads are contacted, the electrical circuit is closed and the alarm is activated. The alarm is any conventional signal such as a light or an audible alarm. Activation of the signal means there has been a failure of the primary hose, and that such should be replaced. Such warning allows the user to avoid potential financial loss and personal injury.

BRIEF DESCRIPTION OF THE DRAWINGS

The above mentioned features of the invention will become more clearly understood from the following detailed description of the invention read together with the drawings in which.

DESCRIPTION OF PREFERRED EMBODIMENT

Figure 1:
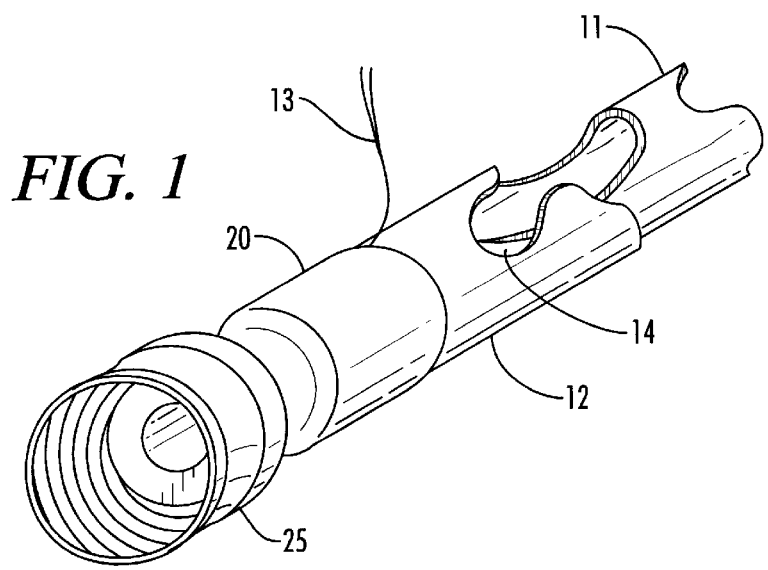
FIG. 1 is a perspective view of a hose of the present invention, connected to a typical hose attachment stem and faucet fastener.
Figure 2:
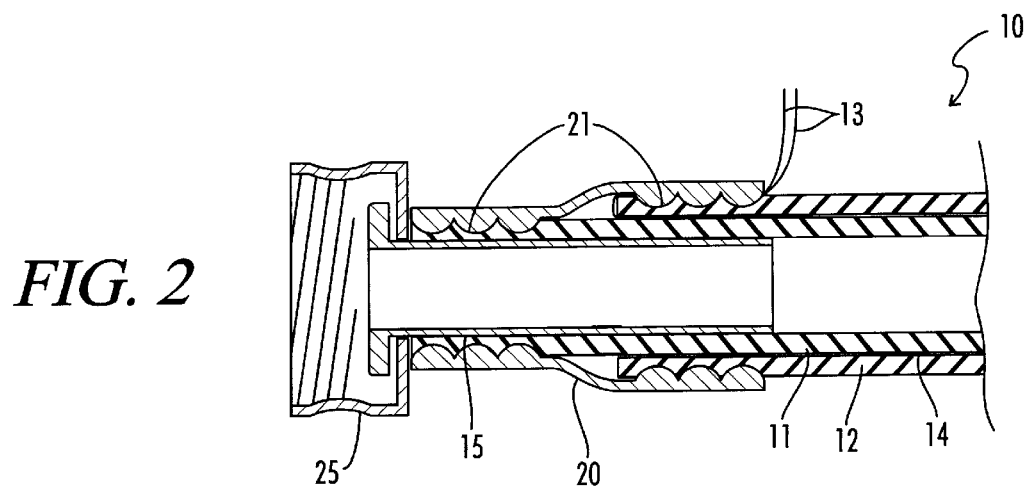
FIG. 2 is a side elevational view, in cross-section, of the hose illustrated in FIG. 1.

A preferred embodiment of the present invention is shown generally at 10 in the perspective view of FIG. 1. FIG. 1 and FIG. 2 demonstrate the hose 10 connected to a hose attachment stem 15 by a two-hose clamp 20. The hose attachment stem, in turn, is connected to an ordinary faucet fastener 25. It is understood, though not depicted, that the faucet fastener 25 can be connected to a generic water faucet, or to the back of a clothes washing machine or an automatic dishwasher.

The hose 10 is comprised first of a primary, or internal, hose 11. This is a circular piece of pliable material such as rubber or vinyl. The primary hose can be any diameter, but typically is 15.87 mm (⅝th inch) in inner diameter. Its wall thickness likewise can vary, though commonly it is 3.174 mm (⅛th inch) in thickness. The primary hose 11 is, by definition, hollow and capable of carrying fluids, usually water or water based fluids. The primary hose 11 may be any color, or clear.

The primary hose 11 is received within a secondary hose 12, which is also constructed of pliable material such as rubber or vinyl. This hose 12 is typically transparent, or at least partially translucent, although it can be any color. The inner diameter of the secondary hose 12 is only slightly larger than the outer diameter of the primary hose 11, it being the intention of this invention that the secondary hose 12 encompass, and loosely rest along, the primary hose 11. Hence, in its preferred embodiment the inner diameter of the secondary hose 12 is 1.587 mm (¹⁄₁₆th inch) larger than the outer diameter of the primary hose 11, making its inner diameter 20.631 mm (¹³⁄₁₆th inch).

Within the annular space 14 of the two hoses rests two electrical wires 13, such as 22 gauge uninsulated copper wires. These wires are spaced apart through substantial sections of the hose 10, and at a distal end extend beyond the hose 10 so as to be connectable to a low voltage source. Those skilled in the art will recognize that there are many ways in which the wires 13 may rest between the two hoses 11, 12. For example, the wires 13 may run along the length of the primary hose 11, or they may wrap around the hose 11 in a spiral fashion. The only criteria for purposes of this invention is that the wires 13 must not cross or come into direct contact with each other.

The preferred embodiment of this invention uses the hose 10 to transport water from a faucet in a home to the back of a domestic clothes washing machine, automatic dishwashing machine, or other appliance. The hose 10 would typically be 4 feet in length, though it could be any length necessary to mate the hot and cold water sources with the machine. Each end of the hose 10 sealingly receives and mates with a stem 15, which is a short hose, usually no more than 50.78 to 76.18 mm (two to three inches) in length. The stem 15 actually appears to be a plastic tube having a collar at a distal end to engage the interior of the "faucet fastener" or threaded connector 25. The outer diameter of the stem 15 is dimensioned such that the stem 15 is closely received by the primary hose 11.

Figure 3:
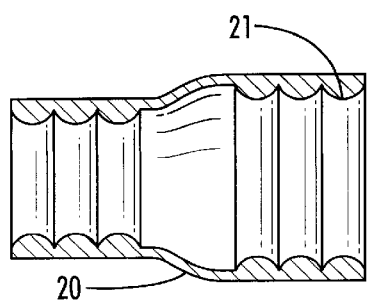
FIG. 3 is a side elevation view, in cross-section, of a two-hose clamp unit incorporated in the hose of FIG. 1.

The stem 15 is connected to the hose system 10 with a two-hose clamp 20. The clamp 20 is depicted in FIG. 3. This clamp 20 defines two female ends, one of which has an inner diameter substantially similar to the outer diameter of the primary hose 15, and one of which has an inner diameter substantially similar to the outer diameter of the secondary hose 12. The thickness of the clamp 20 may vary, depending upon the intended application. However, it is typically 6.35 mm (¼th inch) thick. The clamp 20 is hollow, allowing it to slidably receive the primary hose 11 in its smaller end, and the secondary hose 12 in its larger end. The clamp 20 may be any color, and is typically fabricated from rigid material.

The outer wall of the clamp 20 is smooth; however, the inner wall defines retaining ribs 21 which provide texture to the inner surface. The dimples 21 help create a seal between the clamp 20 and the outer walls of the primary hose 11 and secondary hose 12.

The purpose of the clamp 20 is to provide a sealed connection between the stem 15 and the primary hose 11, and between the primary hose 11 and the secondary hose 12. To further facilitate the seal, the user may choose to use conventional retractable metal rings, or hose clamping devices (not shown), proximate each end of the clamp 20.

To attach the clamp 20 to the stem 15 and hose 10, a section of secondary hose 12 is cut away from one end of the hose 10. This will expose a length of the lead wires 13 and primary hose 11. The wires are then pulled back over the secondary hose 12 so that they may remain exposed. The smaller female end of the clamp 20 is forced over the proximal end of the stem 15, and then over the primary hose 11 by pushing the stem into the primary hose 11. (A small application of surfactant may be used to facilitate the sliding of the clamp 20 over the proximal end of the primary hose 11). Simultaneously, the larger female end of the clamp 20 is forced into engagement with the secondary hose 12. A length of exposed wire from the leads 13 remains to be attached to separate positive and negative leads running from the low voltage source.

Figure 4:
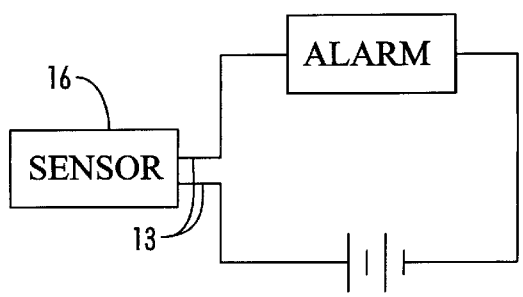
FIG. 4 is an electrical circuit diagram used in accordance with the present invention.

The low voltage source, connected with the lead wires 13 and an alarm, is depicted in FIG. 4. Those skilled in the art will understand that a low voltage source refers to any source, such as a 9 volt battery. The electrical source should be low voltage so as to avoid the risk of shock, there being a concern that anyone who stands in water is actually standing in the circuit. A sensor 16 is provided to sense the presence of water between the primary hose 11 and secondary hose 12. This sensor in one embodiment comprises two uninsulated wires 13 which are shorted when exposed to an electrically conductive fluid such as water. When the primary hose 11 fails, fluid will fill the annular space 14. The sensor 16 will detect the presence of fluid and provide a suitable signal to a user. If the sensor is two uninsulated wires, contact with water or some electrically conductive fluid will close the circuit. Upon such closure of the circuit or other sensor detection, the alarm is energized and activates the signal. This signal could be an LED visual indication of a leak or an audible indication. At the point of failure of the primary hose, the fluid source may be shut off to allow replacement of the hose 10. Therefore, repair or replacement of the hose system 10 is done before any property damage or personal injury occurs.

The description given above presents a hose designed to provide warning of imminent failure, in its preferred embodiment. Numerous alternative embodiments do exist. For example, in an alternate embodiment (not shown), the primary hose is much larger and is capable of transporting water heavily weighted with drilling mud at 2000 pounds of pressure. A secondary hose large enough to encompass the primary hose is in place, and thicker lead wires are used in the annulus. The ends of the hose are clamped onto the pump and the blowout preventor, respectively, allowing the hose to serve as a conduit for drilling fluids.

Figure 5:
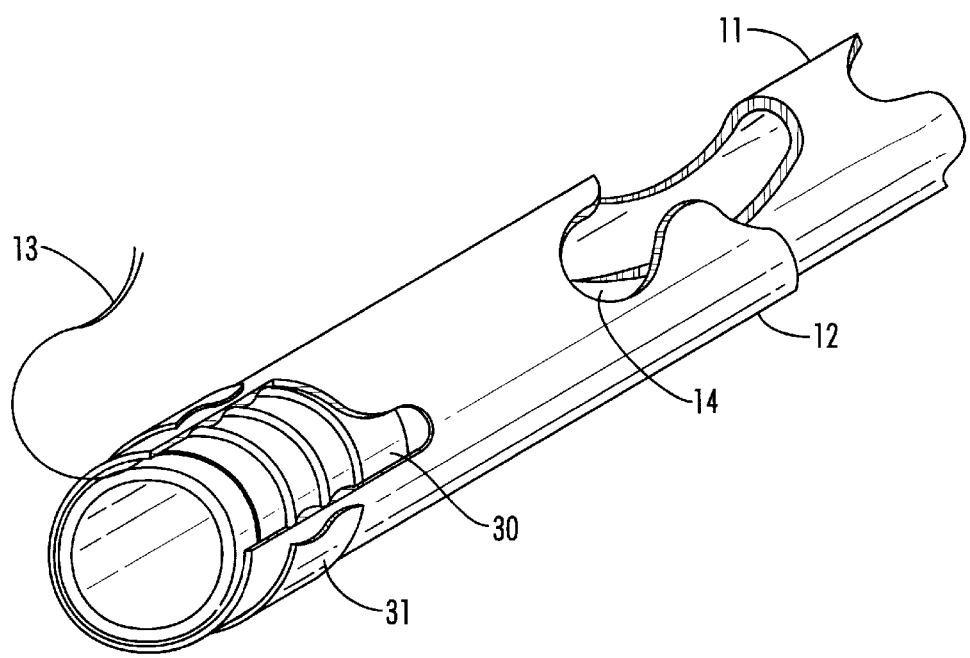
FIG. 5 is a perspective view of an alternate embodiment of a hose of the present invention, connected to a fluid containment band and a typical adjustable clamp.
Figure 6:
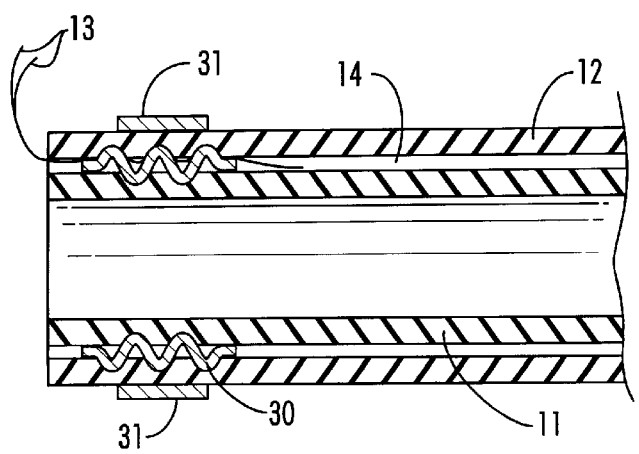
FIG. 6 is a side elevational view, in cross-section, of the hose illustrated in FIG. 5.
Figure 7:
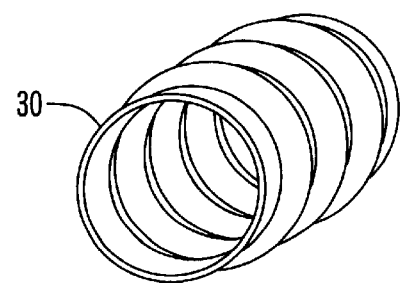
FIG. 7 is a perspective view of a fluid containment band used in conjunction with the hose of FIG. 5.

Another example of an alternative embodiment defines a hose 10 with a fluid containment band 30 positioned at each end of the primary hose 11. The fluid containment band 30 is fabricated from a rigid material and may be of any length less than 76.18 mm (3 inches), though typically it would be 12.7 mm to 25.392 mm (½ to 1 inch) in length. The band 30 is cylindrical and defines circular ribs which provide texture to the surface of the inner and outer walls. The inner diameter of the containment band 30 is the same as the outer diameter of the primary hose 11, or only 0.7935 mm (¹⁄₃₂nd inch) larger, it being the intention that the containment band 30 closely and sealingly receive the primary hose 11. The thickness of the band will be of sufficient size to fill the annular space 14 between the primary hose 10 and the secondary hose 12, such thickness typically being 3.174 mm (⅛th inch). The containment band 30 rests at a distal end of the hose 10, and is positioned sealingly between the primary hose 11 and the secondary hose 12. The distal end of the hose 10 with the containment band 30 then sealingly receives an external hose, stem or nipple (not depicted) which is part of any external fluid source or fluid receiver. The connection between the hose 10 and the external hose, stem or nipple can be further secured by placing a retractable banding clamp 31 around the secondary hose 12 at the same distal end. The two-hose clamp 20 of FIG. 3 and the faucet fastener of FIG. 1 and FIG. 2 would not be needed. Such an arrangement is depicted by FIG. 5 and FIG. 6, with the fluid containment band specifically depicted in its perspective view in FIG. 7.

From the foregoing description, it will be recognized by those skilled in the art that a hose offering advantages over the prior art has been provided. Specifically, the hose defines two hoses, one coaxially aligned within the other, containing between the hoses two wires connected to a low voltage source and a signal so as to provide an electrical warning system for internal failure. Thus, the hose provides a means for detecting partial failure prior to the occurrence of complete failure such that repair may be made prior to an event of property damage or personal injury.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A fluid system comprising:
   a) a fluid source, wherein said fluid source is a pressurized domestic water supply;
   b) a fluid receiver, wherein said receiver is selected from the group consisting of an automatic dishwasher and a clothes washing machine;
   c) a water-based fluid contained within said system;
   d) a pliable conduit unit for carrying said fluid, said conduit unit providing for an indication of imminent failure of said conduit unit, said conduit unit comprising:
      i) an internal pliable conduit through which said fluid is transported from an input end to an output end;
      ii) an external pliable conduit which receives said internal conduit from said input end to said output end, a sealed annulus being defined between said internal conduit and said external conduit;
      iii) connectors for attaching said pliable conduit unit to said fluid source at one end of said pliable conduit unit and said fluid receiver at the other end of said pliable conduit unit; and
      iv) an alarm circuit, including a sensor for detecting the presence of said fluid and energizing the alarm upon detection of said fluid within said annulus.

2. The system of claim 1 wherein said connectors comprise:
   a receiver stem connected to said other end of said pliable conduit unit; and
   a faucet fastener connecting said fluid receiver to said receiver stem.

3. The system of claim 2 wherein said connectors further comprise:
   a supply stem connected to said one end of said pliable conduit unit; and
   a faucet fastener connecting said fluid source to said supply stem.

4. A fluid transport system comprising:
   a) a fluid source;
   b) a fluid receiver;
   c) a fluid contained within said system, wherein said fluid is water-based and includes anti-freeze;
   d) a pliable conduit unit for carrying said fluid, said conduit unit providing for an indication of imminent failure of said conduit unit, said conduit unit comprising:
      i) an internal pliable conduit through which said fluid is transported from an input end to an output end;
      ii) an external pliable conduit which receives said internal conduit from said input end to said output end, a sealed annulus being defined between said internal conduit and said external conduit;
      iii) connectors for attaching said pliable conduit unit to said fluid source at one end of said pliable conduit unit and said fluid receiver at the other end of said pliable conduit unit; and
      iv) an alarm circuit, including a sensor for detecting the presence of said fluid and energizing the alarm upon detection of said fluid within said annulus.

5. The system of claim 4 wherein said fluid receiver is an automobile radiator.

6. The system of claim 4 wherein said fluid source is an automobile radiator.

* * * * *